US011207866B2

(12) United States Patent
Johnston et al.

(10) Patent No.: US 11,207,866 B2
(45) Date of Patent: Dec. 28, 2021

(54) METHOD TO EMBED AN ANTENNA WITHIN A COMPOSITE PANEL

(71) Applicant: The Boeing Company, Chicago, IL (US)

(72) Inventors: Scott Johnston, St. Louis, MO (US); Manny Urcia, Wildwood, MO (US)

(73) Assignee: THE BOEING COMPANY, Chicago, IL (US)

(*) Notice: Subject to any disclaimer, the term of this patent is extended or adjusted under 35 U.S.C. 154(b) by 56 days.

(21) Appl. No.: 16/733,383

(22) Filed: Jan. 3, 2020

(65) Prior Publication Data

US 2021/0206139 A1    Jul. 8, 2021

(51) Int. Cl.
*B32B 5/26* (2006.01)
*H01Q 1/22* (2006.01)

(52) U.S. Cl.
CPC .................. *B32B 5/26* (2013.01); *H01Q 1/22* (2013.01); *B32B 2260/023* (2013.01)

(58) Field of Classification Search
CPC ........ B32B 2260/023; B32B 5/26; H01Q 1/22
See application file for complete search history.

(56) References Cited

U.S. PATENT DOCUMENTS

| 8,551,380 | B2 | 10/2013 | Hawkins et al. |
| 9,770,873 | B2 | 9/2017 | Gilbert et al. |
| 10,118,321 | B2 | 11/2018 | Witte et al. |
| 10,308,000 | B2 | 6/2019 | Dalal et al. |
| 2002/0153368 | A1* | 10/2002 | Gardner .................. B32B 17/04 219/545 |
| 2007/0257152 | A1* | 11/2007 | Bergerson ............... B32B 25/02 244/133 |

* cited by examiner

*Primary Examiner* — Vishal I Patel
(74) *Attorney, Agent, or Firm* — Coats & Bennett, PLLC (57) ABSTRACT

A composite member that includes plies of composite material and an integral antenna. The integral antenna includes one or more plies of conductive material. A pin is connected to and extends outward from one of the conductive plies. The pin extends through openings in one or more of the composite plies that are positioned between and/or around the one or more plies of conductive material.

20 Claims, 7 Drawing Sheets

METHOD TO EMBED AN ANTENNA WITHIN A COMPOSITE PANEL

TECHNOLOGICAL FIELD

The present disclosure relates generally to the field of composite members and, more specifically, to composite members with an embedded antenna.

BACKGROUND

The manufacturing of composite members includes laying up fiber-reinforced composite plies on a mold tool. Each of the individual plies has a fiber orientation angle in which the fibers are aligned within the ply. The different plies can be arranged at various orientations relative to the other plies. The stacking sequence of the individual plies in the composite laminate is a consideration in the design and manufacture of composite members. Plies having design variables, such as material and fiber orientation and ply thickness, may preferably be oriented and sequenced in an optimal arrangement to provide the optimal structural performance. The number of plies and types of materials can vary depending on the expected use of the composite member. The composite plies that are stacked together are then cured to form the composite member.

The multiple plies arranged at various orientations form a composite member that can provide superior structural performance over the individual material properties of each ply. This provides for the composite members to be used in a wide variety of applications such as but not limited to various parts on vehicles such as aircraft, trucks, boats, as well as structural components for buildings. The use of these members is effective due to their low weight, high strength-to-weight ratios, and design flexibility.

Composite structures may be used in applications that demand additional functionality. However, the composite members should be constructed in a manner in which the structural performance of the multi-ply construction is not adversely affected.

SUMMARY

One aspect is directed to a method of forming an antenna within a composite member. The method comprises: sequentially laying up a plurality of first composite plies on a mold tool and aligning an opening in each of the first composite plies and forming a receptacle; laying up a conductive ply on the first composite plies and inserting a pin that is connected to the conductive ply into the receptacle; and laying up a second composite ply and embedding the conductive ply within an interior space formed between the second composite ply and the first composite plies.

In another aspect, the conductive ply is a first conductive ply and the method further comprises laying up one or more additional composite plies and one or more additional conductive plies between the first conductive ply and the second composite ply with at least one of the additional composite plies positioned between the first conductive ply and the additional conductive plies and between each of the additional conductive plies.

In another aspect, the method further comprises spacing outer edges of the conductive ply inward from outer edges of the first composite plies and the second composite ply and preventing exposure of the conductive ply.

In another aspect, the method further comprises connecting the pin to the conductive ply prior to laying up the conductive ply on the first composite plies.

In another aspect, the method further comprises inserting a base over the pin and into the receptacle after laying up the conductive ply on the first composite plies.

In another aspect, the method further comprises curing the first composite plies and the conductive ply prior to inserting the base over the pin and into the receptacle.

In another aspect, the method further comprises aligning the first composite plies relative to the mold tool and forming the receptacle at an opening in the mold tool such that the receptacle is in communication with the opening.

In another aspect, the method further comprises inserting the pin through the opening in the mold tool while laying up the conductive ply on the first composite plies.

In another aspect, the method further comprises forming the first composite plies and the conductive ply into a cover panel for a tail of a helicopter.

One aspect is directed to a method of forming an antenna within a composite member. The method comprises: sequentially laying up a plurality of first composite plies on a mold tool; laying up a conductive ply on the first composite plies and extending a pin that is bonded to the conductive ply outward away from the first composite plies; and laying up one or more second composite plies on the conductive ply and inserting the pin into an opening in each of the one or more second composite plies.

In another aspect, the conductive ply is a first conductive ply and the method further comprises laying up one or more additional conductive plies and spacing apart the one or more additional conductive plies from the first conductive ply.

In another aspect, the method further comprises embedding the conductive ply between the first composite plies and the one or more second composite plies.

In another aspect, the method further comprises inserting a base over the pin after curing the first composite plies, the conductive ply, and one or more second composite plies.

One aspect is directed to a composite member with an integrated antenna. The composite member comprises a plurality of composite plies, a plurality of conductive plies embedded within the plurality of composite plies with each of the plurality of conductive plies being spaced apart by at least one of the composite plies, and a pin bonded to a first one of the conductive plies and that extends outward from a first side of the first conductive ply with the pin extending through each of the one or more composite plies on the first side of the first conductive ply.

In another aspect, the composite member further comprises a base that extends around the pin and that is positioned within a receptacle formed in the one or more composite plies on the first side of the first conductive ply.

In another aspect, the base contacts against the first conductive ply.

In another aspect, the pin is an RF coaxial pin.

In another aspect, each of the plurality of conductive plies has a smaller area than the plurality of composite plies to be embedded within the plurality of composite plies.

In another aspect, the composite member is a cover panel for a tail of a helicopter.

In another aspect, each of the plurality of conductive plies is constructed from a same material.

The features, functions and advantages that have been discussed can be achieved independently in various aspects or may be combined in yet other aspects, further details of which can be seen with reference to the following description and the drawings.

DETAILED DESCRIPTION

Figure 1:
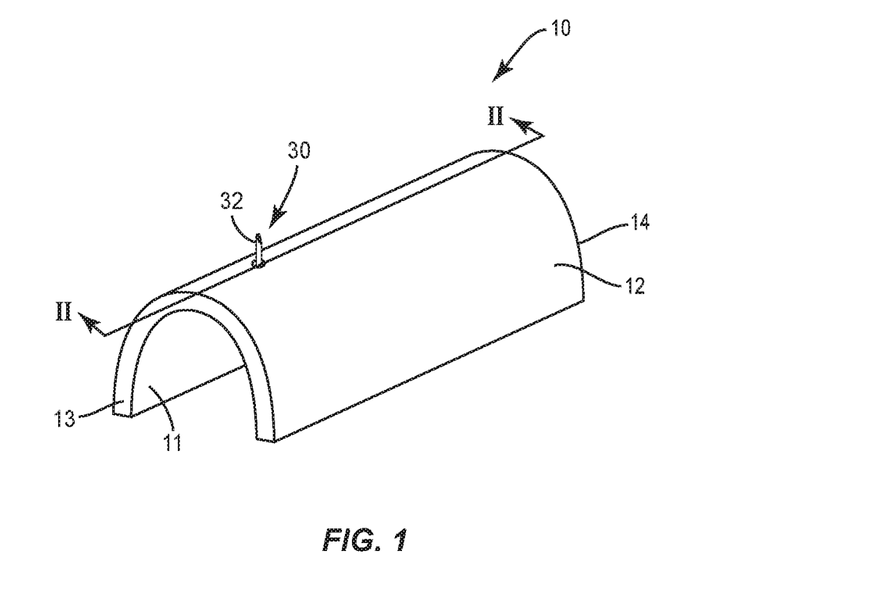
FIG. 1 is perspective view of a composite member.
Figure 2:
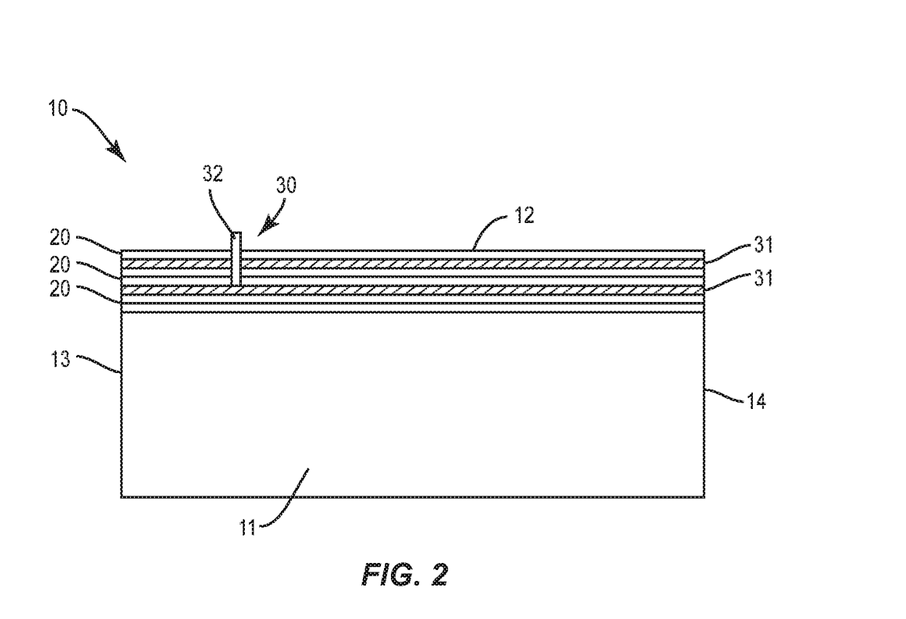
FIG. 2 is section view cut along line II-II of FIG. 1.

FIGS. 1 and 2 illustrate a composite member 10 that includes an integrated antenna 30. The composite member 10 is constructed from plies 20 of composite material and one or more conductive plies 31 that are disposed within the composite plies 20. A pin 32 is connected to and extends outward from one of the conductive plies 31. The pin 32 can extend through one or more of the plies 20, 31 and outward from one side of the composite member 10.

The composite member 10 can include a variety of shapes and sizes. The composite member 10 includes a first side 11 and an opposing second side 12. In one example as illustrated in FIGS. 1 and 2, the first side 11 is an inner side and the second side 12 is an outer side. The composite member 10 includes a length measured between opposing first and second ends 13, 14. The composite member 10 can include various shapes and sizes, with FIG. 1 including a generally bowed shape that extends along the length. One specific application for the composite member 10 is for use on a tail assembly of a helicopter. The composite member 10 can also include various other shapes and sizes, such as but not limited to being flat.

Figure 3:
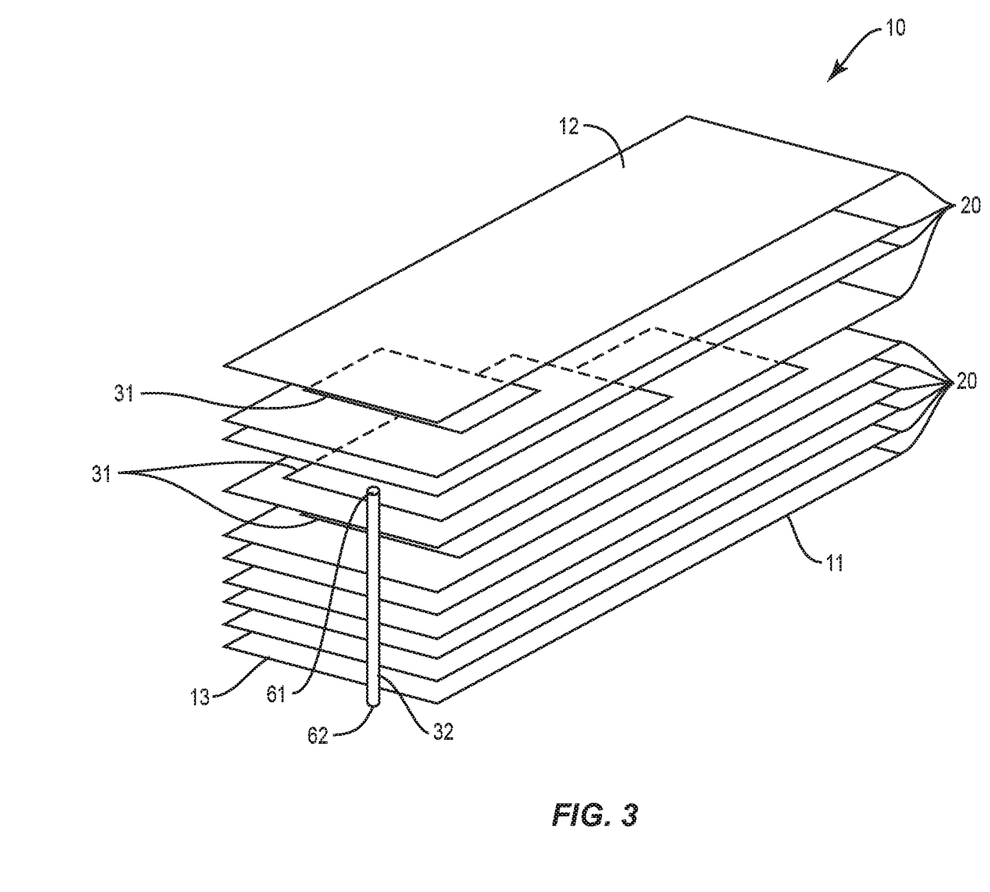
FIG. 3 is an exploded schematic view of a composite member that includes composite plies, conductive plies, and a pin.

FIG. 3 illustrates a schematic exploded view of a composite member 10 having a generally flat shape. The composite member 10 is constructed from overlapping composite plies 20 and conductive plies 31. The conductive plies 31 are spaced apart from each other by one or more of the composite plies 20. This position prevents the conductive plies 31 from being in contact. A pin 32 is attached to one of the conductive plies 31. The pin 32 includes a length to extend through one or more of the composite plies 20 and outward from one of the first and second sides 11, 12. In another example, the pin 32 also extends through one or more of the conductive plies 31.

The composite member 10 can include different numbers and sizes of composite plies 20 and conductive plies 31. The composite plies 20 form the first and second sides 11, 12, with the conductive plies being positioned between the composite plies 20. In one example as illustrated in FIG. 3, the composite plies 20 are larger than the conductive plies 31 thus positioning the conductive plies 31 within their perimeter. In this example, the conductive plies 31 are embedded within the interior of the composite member 10 by the composite plies 20. In another example as illustrated in FIG. 2, one or more of the conductive plies 31 can be exposed on the exterior of the composite member 10, such as at one or both of the first and second ends 13, 14.

The different composite plies 20 can include various shapes and sizes. FIG. 3 illustrates each of the composite plies 20 having the same shape (i.e., rectangular) and size. Other examples can include different composite plies 20 with different shapes and/or sizes. Likewise, the conductive plies 31 can each have the same or different shapes and/or sizes. The number, shape, and size of the composite plies 20 can vary depending upon the desired overall shape of the composite member 10. The number, shape, and size of the conductive plies 31 can vary depending upon the desired characteristics of the antenna 30.

The composite plies 20 include one or more layers of unidirectional fibers that are pre-impregnated with a thermoset or thermoplastic matrix resin (e.g., prepreg). In another example, the matrix resin includes a hybrid system of both thermoset and thermoplastic. The matrix resin can be formed from a variety of substances, including but not limited to acrylics, fluorocarbons, polyamides (PA), polyethylenes (PE) such as polyethylene terephthalate (PET), polyesters, polypropylenes (PP), polycarbonates (PC), polyurethanes (PU), polyetheretherketones (PEEK), polyetherketoneketones (PEKK), polyetherimides (PEI), and other material compositions. The fibers can be formed from a variety of materials, including but not limited to aramids, polyolefins, metal, glass, carbon, boron, ceramic, mineral, and combinations. The majority of the fibers can have various orientations, such as but not limited to being oriented parallel to the lengthwise direction and oriented perpendicular to the lengthwise direction. The composite plies 20 can include a variety of thicknesses. Examples include but are not limited to thicknesses of between about 0.0025-0.0175 inches. The composite plies 20 that form the composite member can each be constructed from the same or different materials.

The conductive plies 31 can be constructed from various materials including but not limited to copper, stainless steel, aluminum, and iron. In one example of a composite member 10 with multiple conductive plies 31, each of the conductive plies 31 has the same construction. In another example, two or more of the conductive plies 31 have different constructions. The conductive plies 31 can have various thicknesses.

The pin 32 is connected to one of the conductive plies 31. The pin 32 is constructed from a conductive material. In one example, the pin 32 is constructed from the same material as the conductive ply 31 to which it is attached. In another example, the pin 32 is constructed from a different material. The pin 32 can be connected in a variety of manners, including but not limited to epoxy, brazing, soldering, and mechanical fasteners. The pin 32 generally includes an elongated shape with a first end 61 that is attached to the conductive ply 31 and an opposing second end 62. The length of the pin 32 measured between the first and second ends 61, 62 can vary depending upon the construction of the composite member 10 and the desired use. In one example, the pin 32 includes a straight shape and is perpendicular to the surface of the conductive ply 31 to which it is attached.

Other examples include the pin 32 have different shapes, and extending at different angular orientations relative to the conductive ply 31.

In composite members 10 with multiple conductive plies 31, the pin 32 is electrically connected to the one or more additional other conductive plies 31. The electrical connection can include being physically connected to one or more of the other conductive plies 31. This can include being directly contacting against one or more of the conductive plies 31, or indirectly connected such as through an intervening member. The electrical connection can also include the pin 32 in in close proximity but no contacting against the one or more other conductive plies 31.

Figure 4:
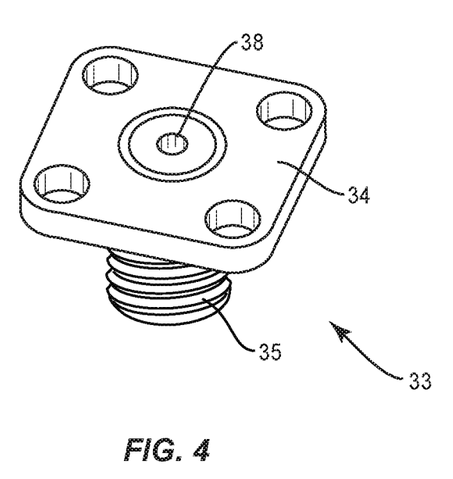
FIG. 4 is perspective view of a base of an antenna.

In addition to the one or more conductive plies 31 and the pin 32, the antenna 30 can also include a base 33 that is connected to the pin 32. FIG. 4 illustrates one example of a base 33 that includes a body 34. One side of the body 34 can be flat to contact against and be connected to one of the conductive plies 31. A neck 35 extends outward from the body 34. One or more of the exterior and interior surfaces of the neck 35 are threaded to connect with cabling to be operatively connected to an electrical component. An opening 38 extends through the body 34 at the neck 35 and is sized to receive the pin 32. In one example, the base 33 and pin 32 form a SubMinature version A (SMA) coaxial connector.

The composite member 10 is constructed using a layup process in which the various plies 20, 31 are layed up one a mold tool 50 in sequential order. FIGS. 5A-5D illustrate one method of forming a composite member 10 with an integral antenna 30. The mold tool 50 includes a contact surface 51 that corresponds to the desired shape of the composite member 10. The mold tool 50 includes an opening 52 that extends into the contact surface 51 and may extend through a entirety of the mold tool 50. The opening 52 is sized to receive the pin 32 during the layup process as will be explained below.

Figure 5A:
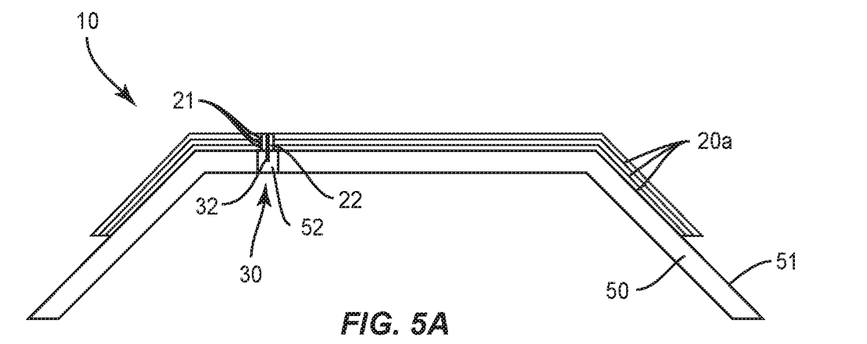
FIGS. 5A-5D are side schematic views of a method of forming a composite member that includes an integral antenna.

As illustrated in FIG. 5A, the process includes laying up one or more composite plies 20a onto the mold tool 50. These initial composite plies 20a form an inner portion of the composite member 10, including the first side 11. The composite plies 20a can be made from the same or different materials. Further, the composite plies 20a can be layed up with the fibers arranged at various orientations relative to the other plies 20a. In one example, the adjacent plies 20a include fibers that are transverse to each other. In another example, the adjacent plies 20a include a common fiber orientation.

The initial composite plies 20a each include an opening 21. During layup, the composite plies 20a are aligned such that the openings 21 form a receptacle 22 sized to receive the pin 32. The composite plies 20a are further aligned such that the receptacle 22 is aligned with the opening 52 in the mold tool 50. The receptacle 22 and opening 52 are in communication and sized and positioned to receive the pin 32.

Figure 5B:
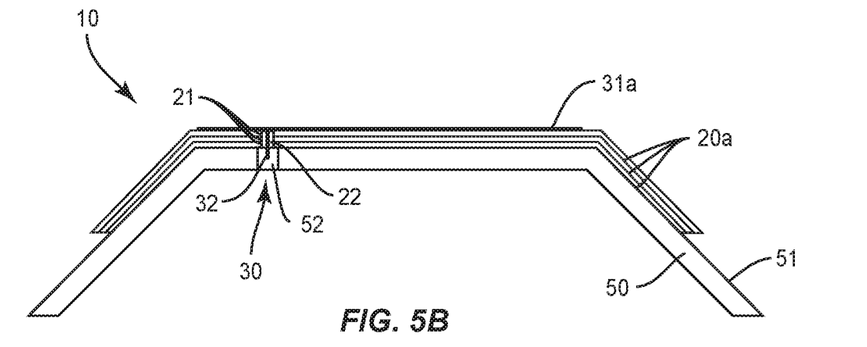

As illustrated in FIG. 5B, a first conductive ply 31a is layed up on these composite plies 20a. The first conductive ply 31a includes the attached pin 32. During layup, the pin 32 is inserted into the receptacle 22 of the first composite plies 20a, and the opening 52 in the mold tool 50. In another example, the pin 32 extends into the receptacle 22, but is short such that it does not extend into the opening 52 in the mold tool 50.

Figure 5C:
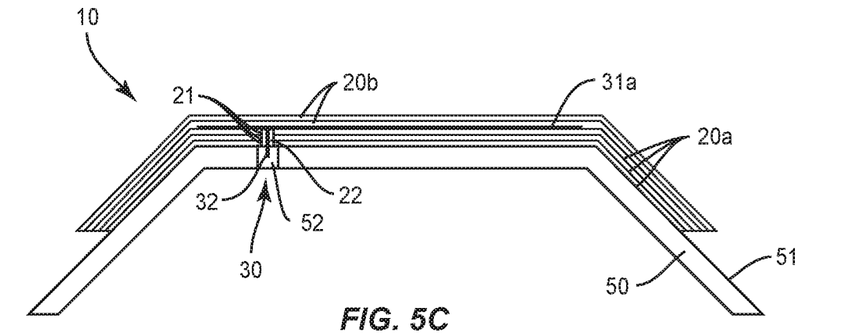

As illustrated in FIG. 5C, one or more additional composite plies 20b are layed up on the conductive ply 31a. The composite plies 20b extend over and embed the conductive ply 31a. The composite plies 20b can include the same or different constructions than the composite plies 20a.

Figure 5D:
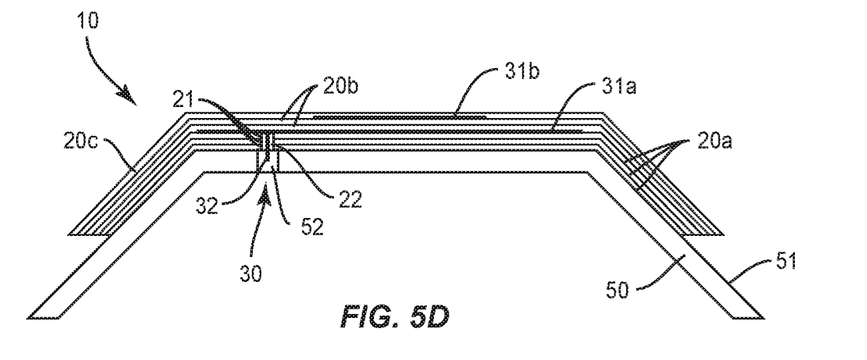

As illustrated in FIG. 5D, a second conductive ply 31b is layed up on the composite plies 20b. The second conductive ply 31b is spaced away from the first conductive ply 31a by the composite plies 20b. One or more additional composite layers 31c are then layed up on the second conductive ply 31b. The various composite layers 20a, 20b, 20c embed and space apart the conductive plies 31a, 31b. Thus, the antenna 30 is integral with the composite member 10 and includes the pin 32 and conductive plies 31a, 31b. The composite member 10 can then be cured.

Figure 6:
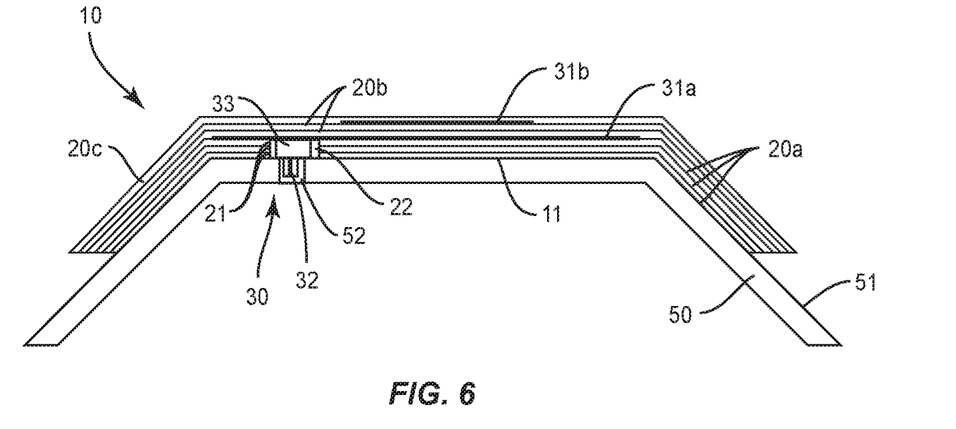
FIG. 6 is a side view of a composite member positioned on a mold tool.

FIG. 6 illustrates a composite member 10 with an antenna 30 that includes a base 33 positioned on the pin 32. The base 33 is sized to fit within the opening 52 in the mold tool 50 and the receptacle 22 in the composite plies 20a. The base 33 is inserted onto the pin 32 and the body 34 is moved into contact against the first conductive ply 31a. The base 33 can be sized to extend outward beyond the first side 11. In another example, the base 33 is contained within the receptacle 22 and recessed below the first side 11.

In one example, the base 33 is placed onto the pin 32 and then the entire composite member 10 is cured. In another example, the base 33 is placed onto the pin 32 after the composite member 10 has cured.

Figure 7A:
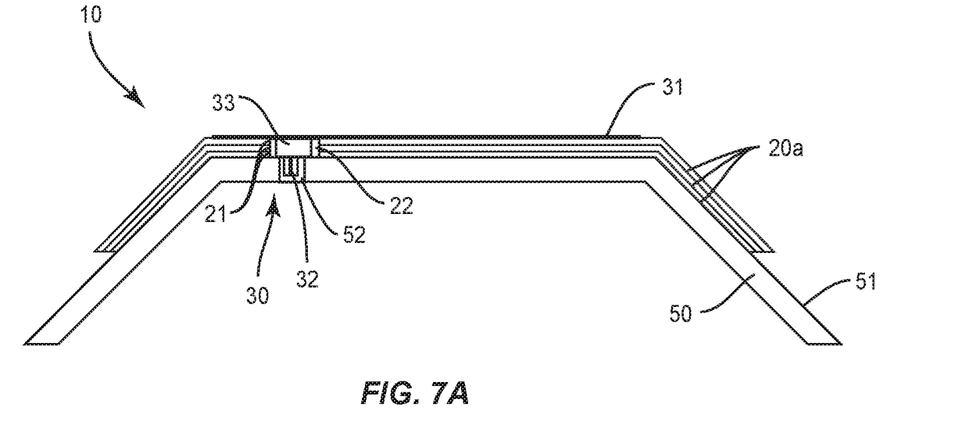
FIGS. 7A-7B are side schematic views of a method of forming a composite member that includes an integral antenna.
Figure 7B:
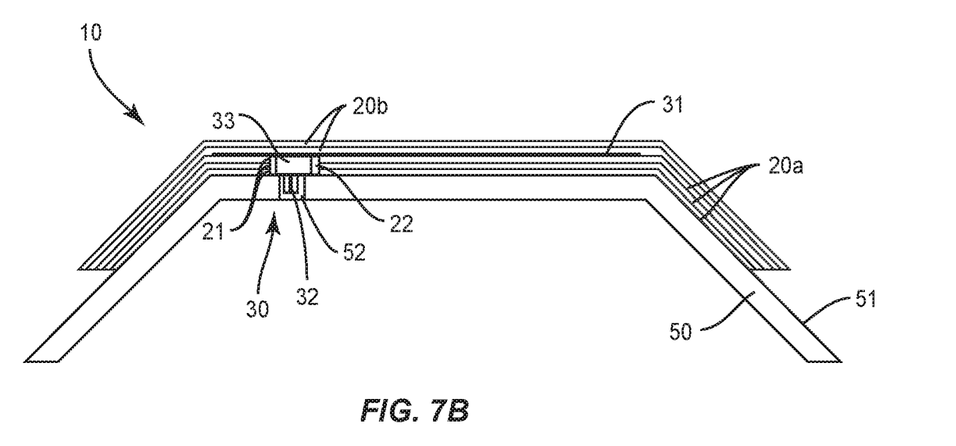

FIGS. 7A-7B illustrate a method of forming a composite member 10. As illustrated in FIG. 7A, one or more composite plies 20a are layed up onto the mold tool 50. Each of the composite plies 20a includes an opening 21 that are aligned together to form a receptacle 22.

A conductive ply 31 is layed up onto the composite plies 20a. A pin 32 is connected to and extends outward from the conductive ply 31. The pin 32 extends through the receptacle 22 and can extend into the opening 52 in the mold tool 50 depending upon the length. The base 33 is then inserted over the pin 32 and moved into the receptacle 22 and into contact with the conductive ply 31. The base 33 can be attached to the conductive ply 31 in various manners, including but not limited to adhesives, soldering, and fasteners.

As illustrated in FIG. 7B, one or more additional composite plies 20b are layed up over the conductive ply 31. The additional composite plies 20b embed the conductive ply 31.

In the method described above, the base 33 is inserted over the pin 32 and attached to the conductive ply 31 prior to laying up the additional composite plies 20b. In another example, the one or more additional composite plies 20b are layed up on the conductive ply 31, and then the base 33 is attached to the conductive ply 31.

In one example, the composite member 10 that includes the composite plies 20a, 20b, conductive ply 31, pin 32, and base 33 are cured together. In another example, the composite member 10 that includes the composite plies 20a, 20b, conductive ply 31, and pin 32 are cured prior to attachment of the base 33.

Figure 8A:
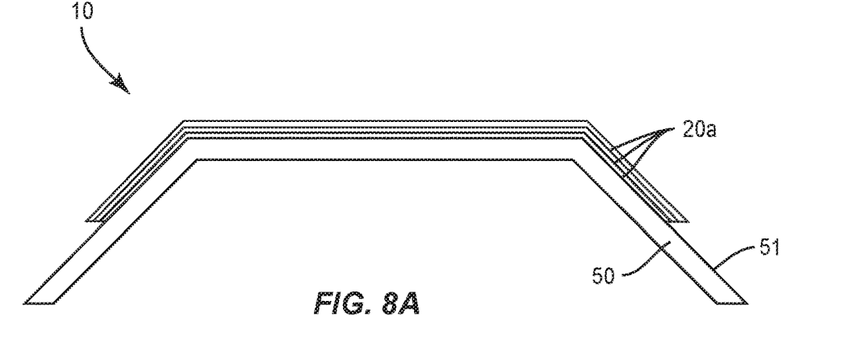
FIGS. 8A-8D are side schematic views of a method of forming a composite member that includes an integral antenna.
Figure 8B:
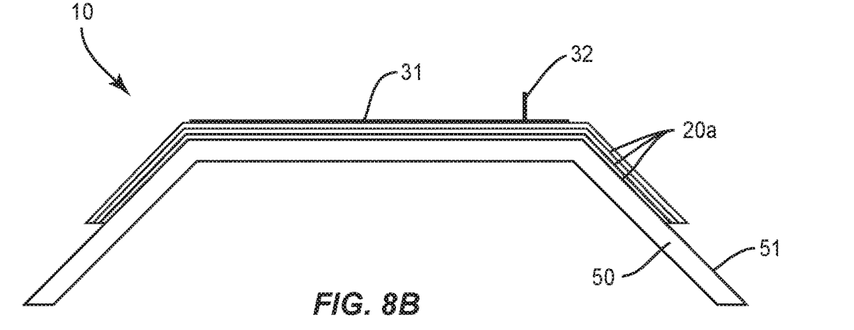

FIGS. 8A-8D illustrate a method of forming a composite member 10. As illustrated in FIG. 8A, one or more composite plies 20a are layed up on the mold tool 50. FIG. 8B illustrates a conductive ply 31 that is layed up on the composite plies 20a. The conductive ply 31 includes a pin 32 that extends outward away from the mold tool 50.

Figure 8C:
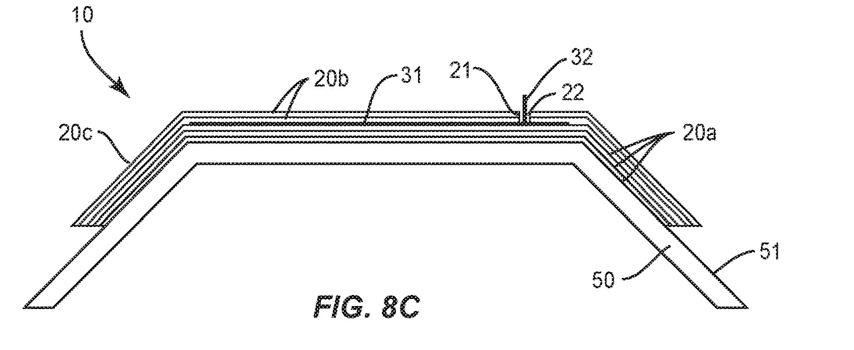

As illustrated in FIG. 8C, one or more additional composite plies 20b are layed up over the conductive ply 31. Each of the additional composite plies 20b includes an opening 21 that extends around the pin 32. The openings 21 form a receptacle 22 in which the pin 32 is positioned. The composite plies 20a, 20b, and conductive ply 31 with the pin 32 are then cured.

Figure 8D:
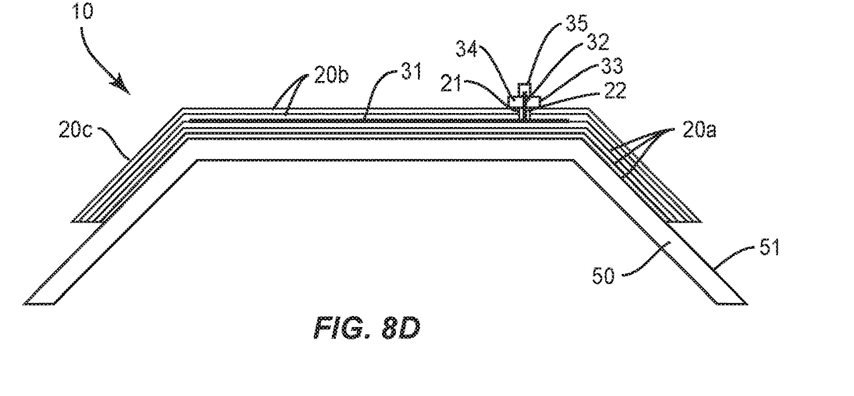

As illustrated in FIG. 8D, the base 33 is mounted on the pin 32 after curing. In one example as illustrated in FIG. 8D, the base 33 receives the pin 32 and is spaced away from the conductive ply 31. In another example, the base 33 receives the pin 32 and is positioned within the receptacle 22 and against the conductive ply 31.

In the various composite members 10, the number and composite plies 20 and conductive plies 31 can vary. In one example, one or more of the conductive plies 31 include openings that receive the pin 32. The pin 32 can contact the conductive plies 31 at the openings, or can be spaced away from the conductive plies 31.

Figure 9:
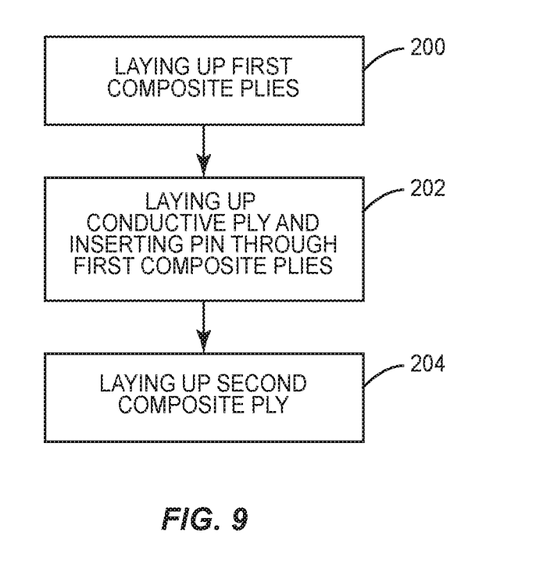
FIG. 9 is a flowchart diagram of a method of forming a composite member that includes an integral antenna.

FIG. 9 illustrates steps of a method of forming an antenna 30 within a composite member 10. The method includes sequentially laying up first composite plies 20a on a mold tool 50 (block 200). In one example, this includes aligning an opening 21 in each of the first composite plies 20a and forming a receptacle 22. In one example, a single composite ply 20a is layed up on the mold tool 50.

The method includes laying up a conductive ply 31 on the first composite plies 20a (block 202). This can include inserting a pin 32 that is bonded to the conductive ply 31 into the receptacle 22 that is formed in the first composite plies 20a.

After the conductive ply 31, the method includes laying up a second composite ply 20b (block 204). Laying up the second composite ply 20b can embed the conductive ply 31 within an interior space formed between the second composite ply 20b and the first composite plies 20a. In one example, a single second composite ply 20b is layed up on the conductive ply 31. In another example, two or more second composite plies 20b are layed up on the conductive ply 31.

Figure 10:
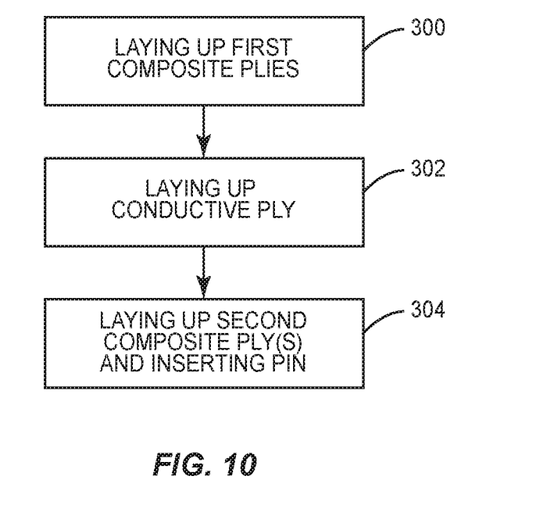
FIG. 10 is a flowchart diagram of a method of forming a composite member that includes an integral antenna.

FIG. 10 illustrates the steps of another method of forming an antenna 30 within a composite member 10. The method includes sequentially laying up first composite plies 20a on a mold tool 50 (block 300). In another example, this step includes laying a single first composite ply 20a. The method then includes laying up a conductive ply 31 on the first composite plies 20a (block 302). This can include extending a pin 32 that is bonded to the conductive ply 31 outward away from the first composite plies 20a.

The method includes laying up one or more second composite plies 20b on the conductive ply 31 (block 304). This can include inserting the pin 32 into an opening 21 in each of the one or more second composite plies 20b.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of forming an antenna within a composite member, the method comprising:
   sequentially laying up a plurality of first composite plies on a mold tool and aligning an opening in each of the first composite plies and forming a receptacle;
   laying up a conductive ply on the first composite plies and inserting a pin that is connected to the conductive ply into the receptacle; and
   laying up a second composite ply and embedding the conductive ply within an interior space formed between the second composite ply and the first composite plies.

2. The method of claim 1, wherein the conductive ply is a first conductive ply, the method further comprising laying up one or more additional composite plies and one or more additional conductive plies between the first conductive ply and the second composite ply, with at least one of the additional composite plies positioned between the first conductive ply and the additional conductive plies and between each of the additional conductive plies.

3. The method of claim 1, further comprising spacing outer edges of the conductive ply inward from outer edges of the first composite plies and the second composite ply and preventing exposure of the conductive ply.

4. The method of claim 1, further comprising connecting the pin to the conductive ply prior to laying up the conductive ply on the first composite plies.

5. The method of claim 1, further comprising inserting a base over the pin and into the receptacle after laying up the conductive ply on the first composite plies.

6. The method of claim 5, further comprising curing the first composite plies and the conductive ply prior to inserting the base over the pin and into the receptacle.

7. The method of claim 1, further comprising aligning the first composite plies relative to the mold tool and forming the receptacle at an opening in the mold tool such that the receptacle is in communication with the opening.

8. The method of claim 7, further comprising inserting the pin through the opening in the mold tool while laying up the conductive ply on the first composite plies.

9. The method of claim 1, further comprising connecting the pin to the conductive ply by one of soldering or brazing.

10. A method of forming an antenna within a composite member, the method comprising:
    sequentially laying up a plurality of first composite plies on a mold tool;
    laying up a conductive ply on the first composite plies and extending a pin that is bonded to the conductive ply outward away from the first composite plies; and
    laying up one or more second composite plies on the conductive ply and inserting the pin into an opening in each of the one or more second composite plies.

11. The method of claim 10, wherein the conductive ply is a first conductive ply, the method further comprising laying up one or more additional conductive plies and spacing apart the one or more additional conductive plies from the first conductive ply.

12. The method of claim 10, further comprising embedding the conductive ply between the first composite plies and the one or more second composite plies.

13. The method of claim 10, further comprising inserting a base over the pin after curing the first composite plies, the conductive ply, and the one or more second composite plies.

14. The method of claim 5, further comprising positioning the base against the conductive ply.

15. The method of claim 10, further comprising spacing outer edges of the conductive ply inward from outer edges of the first composite plies and the one or more second composite plies and preventing exposure of the conductive ply.

16. the method of claim 10, further comprising exposing the conductive ply on the exterior of the composite member.

17. The method of claim 13, further comprising positioning the base within a receptacle formed by the opening in each of the one or more second composite plies.

18. The method of claim 17, further comprising positioning the base against the conductive ply.

19. The method of claim 10, further comprising connecting the pin to the conductive ply by one or soldering or brazing.

20. The method of claim 10, wherein one or more of the first composite plies comprise a layer of unidirectional fibers that are impregnated with a matrix resin.

\* \* \* \* \*